Patented Mar. 15, 1938

2,111,532

UNITED STATES PATENT OFFICE 2,111,532

PROCESS OF TREATING PHOSPHATE

Johnson Hagood, Bartow, Fla., assignor to Southern Phosphate Corporation, a corporation of Delaware No Drawing. Application August 30, 1935,
Serial No. 38,652

4 Claims. (Cl. 71—33)

Various processes have recently been devised for treating raw phosphate rock by removing the fluoride contained therein and making the rock "neutral ammonium citrate soluble", and thus usefully available as a fertilizer, or for other commercial purposes. Those processes have involved a calcining treatment at high temperatures, which are difficult to so control as to prevent fusing the material being treated, and thus making the commercial process difficult to perform as well as endangering the kiln structure used.

The object of the present invention is to provide a novel, simple and practicable process for treating phosphate rock containing fluorine, and specifically fluo-apatite to make available a high percentage of tri-calcium phosphate by removing the fluorine and calcium that is combined with the said fluorine that forms the calcium-fluoride radical in the fluo-apatite molecule, without the necessity of a calcining or other high temperature, though a moderate temperature above atmospheric may be advantageously employed to hasten the reaction.

I have found that this object can be obtained by the employment of a reagent having a high affinity for calcium and fluorine in combination, or calcium fluoride, and that a satisfactory reagent is the soluble salt of a metal having such affinity. I have further discovered that to secure the most satisfactory results it is desirable to carry on the process in a manner that will insure the complete application of the reagent throughout the particles of rock subjected to the treatment.

Reagents that have proven themselves particularly efficacious are soluble aluminum salts and iron salts, preferably sulphates.

As an example, finely divided Florida phosphate rock was mixed with aluminum sulphate $Al_2(SO_4)_3$, and water in the proportion of

| | | |
|---|---|---|
| Phosphate rock | grams | 2270 |
| $H_2O$ | cc | 937 |
| $Al_2(SO_4)_3.18H_2O$ | grams | 280 |

The amount of aluminum sulphate thus employed was in theoretical proportion to react with the calcium fluoride calculated to be in the amount of phosphate rock treated as fluo-apatite. Other fluorine is present probably as "free" or uncombined $CaF_2$. This is a variable of from 20% to 38% of total $F_2$ present. The work in connection with this invention leads to the belief that the reagents employed are highly selective and react first with the calcium-fluoride which is combined in the fluo-apatite molecule.

This mixture was charged into a grinding mill and the mill put into operation.

Samples removed from time to time showed an increasing amount of phosphorous pentoxide made available to citrate extraction. Thus in one hour approximately 17%, in seven hours 57%, and in twenty-four hours 90%, was thus made available. This does not include the amount originally and naturally available in the rock treated.

In another example, and using iron sulphate as the reagent, the following mixture was made:

| | | |
|---|---|---|
| Phosphate rock | grams | 2270 |
| $H_2O$ | cc | 1240 |
| $FeSO_4.7H_2O$ | grams | 340 |

This was treated in the same manner as the first example. At the end of the first hour a sample showed 32% of the phosphorous pentoxide was made available to citrate extraction, at the seventh hour this amount had increased to 47%, and at the end of the twenty-fourth hour, 85% was citrate soluble.

It has further been discovered that if heat is applied from approximately 50 to 100° C., or even above the latter, the reaction takes place much more rapidly. In the presence of heat at a temperature of 100° C., the reaction is materially hastened, and I have found that 50% of the $P_2O_5$ has been made available in two hours.

In carrying out the process as above described, the mill containing the solution of $Fe_2SO_4$ was initially heated to a temperature of 48° C., and the dry phosphate rock charged into the mill. The temperature was then gradually increased. Samples were withdrawn at intervals of time and analyzed. The results were as follows:

| Sample | Grinding time | Temperature | Available $P_2O_5$ | Less 2.58 already available | Percent conversion of $P_2O_5$ available to my reaction |
|---|---|---|---|---|---|
| | Hours | Degrees C. | | | |
| #1 | 1 | 48 | 11.60 | 9.02 | 39.80 |
| #2 | 2 | 50 | 12.40 | 9.82 | 43.40 |
| #3 | 3½ | 63 | 19.90 | 17.32 | 76.50 |

It is thought that the heat tends to make the atoms of fluorine within the mass of the particle, migrate to the surface thereof, replenishing the atoms that have been reacted upon and removed, and thus making said migrated atoms available to the reagent. The temperature can be varied considerably, but is well below that heretofore proposed.

The reason for effecting the reaction during the grinding operation is that fresh surfaces are thereby being constantly created and presented to the reagent, thus causing substantially complete reaction on all the confined atoms. Otherwise the exposed surfaces of the rock particles after having been reacted upon will to a degree become coated and to that extent interfere with the reagent contacting the untreated portions.

The removal of the calcium fluoride radical from the fluo-apatite is due to the fact that the calcium and fluorine react with the aluminum or iron salt to form a permanent negative complex ion that is effectively removed from the field of the reaction, thereby permitting the reaction to proceed and preventing a reversal of the reaction. Thus—

$$3[Ca_3(PO_4)_2]_3.3CaF_2 + Al_2(SO_4)_3 = 9Ca_3(PO_4)_2 + 2AlF_3.3CaSO_4$$

Fluo-apatite + Aluminum sulphate = Tricalcium phosphate + Complex $$3[Ca_3(PO_4)_2]_3.3CaF_2 + Fe_2(SO_4)_3 = 9Ca_3(PO_4)_2 + 2FeF_3.3CaSO_4$$

Fluo-apatite + Ferric sulphate = Tricalcium phosphate + Complex

Ferrous sulphate may be substituted for ferric sulphate in the above.

The process therefore distinguishes from the reactions of the prior art with which I am acquainted in that in the previous processes the fluorine is first removed, leaving the residual calcium temporarily satisfied and still leaving the phosphate unavailable to citrate extraction. This residual calcium therefore has to be removed by high temperature treatment, usually as a silicate. In the present process, however, the fluorine and residual calcium are together removed by simultaneously forming with the reagent a complex negative ion. This obviates the necessity of extremely high calcining temperatures during treatment of the phosphate rock.

The foregoing description is for the purpose of illustration and not of limitations; and it is my intention that the invention be limited only by the appended claims or their equivalents in which I have intended to claim broadly all inherent novelty.

What I claim:

1. The method of increasing the citrate-soluble phosphate content of fluo-apatite that consists of forming a mixture of water, fluo-apatite, and a soluble salt of a metal of the class consisting of aluminum and iron in theoretical proportion to react with the calculated calcium fluoride content of the fluo-apatite, and grinding the mixture at a temperature within the range from room temperature to approximately one hundred degrees centigrade, for a period of time sufficient for the reaction of the salt with the calcium fluoride.

2. The method of increasing the citrate-soluble phosphate content of fluo-apatite that consists of forming a mixture of water, fluo-apatite, and a sulphate of a metal of the class consisting of aluminum and iron in theoretical proportion to react with the calcium fluoride content of the fluo-apatite, and grinding the mixture at a temperature within the range from room temperature to approximately one hundred degrees centigrade, for a period of time sufficient for the reaction of the salt with the calcium fluoride.

3. The method of increasing the citrate-soluble content of fluo-apatite that consists of forming a mixture of water, fluo-apatite and aluminum sulphate in theoretical proportion to react with the calculated calcium fluoride content of the fluo-apatite, and grinding the mixture at a temperature within the range from room temperature to one hundred degrees centigrade, for a period of time sufficient for the reaction of the aluminum sulphate with the calcium fluoride.

4. The method of increasing the citrate-soluble content of fluo-apatite, that consists of forming a mixture of water, fluo-apatite and iron sulphate in theoretical proportion to react with the calculated calcium fluoride content of the fluo-apatite, and grinding the mixture at a temperature within the range from room temperature to one hundred degrees centigrade, for a period of time sufficient for the reaction of the iron sulphate with the calcium fluoride.

JOHNSON HAGOOD.